United States Patent
Kanoh

(10) Patent No.: US 6,678,722 B1
(45) Date of Patent: Jan. 13, 2004

(54) INTERPROCESSOR COMMUNICATION SYSTEM FOR PARALLEL PROCESSING

(75) Inventor: Yasushi Kanoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/568,593

(22) Filed: May 11, 2000

(30) Foreign Application Priority Data

May 14, 1999  (JP) .......................... 11-134960

(51) Int. Cl.[7] .................. G06F 15/167; G06F 15/00; G06F 12/00
(52) U.S. Cl. .................. 709/212; 712/29; 711/156; 711/202
(58) Field of Search .................. 709/212–216; 710/22–28; 711/202–210, 156; 712/28–31

(56) References Cited

U.S. PATENT DOCUMENTS

| | | | | |
|---|---|---|---|---|
| 5,386,566 A | * | 1/1995 | Hamanaka et al. | 709/310 |
| 5,522,045 A | * | 5/1996 | Sandberg | 709/215 |
| 5,592,625 A | * | 1/1997 | Sandberg | 711/147 |
| 5,790,804 A | * | 8/1998 | Osborne | 709/245 |
| 6,049,808 A | * | 4/2000 | Talluri et al. | 707/201 |
| 6,101,551 A | * | 8/2000 | Kanoh | 709/245 |
| 6,134,602 A | * | 10/2000 | Engstrom et al. | 709/328 |

FOREIGN PATENT DOCUMENTS

EP          0447145 A2  *  9/1991

* cited by examiner

Primary Examiner—Andrew Caldwell
(74) Attorney, Agent, or Firm—Young & Thompson

(57) ABSTRACT

The present invention is directed to providing an interprocessor communication system capable of obviating degradation of the performance in an interprocessor communication caused by the processing to avoid a page fault. In this system, a source processor transmits a check packet directly after successive data is transmitted by the interprocessor communication, to confirm whether or not a page fault takes place on the receiver side. The source processor carries out no processing in the case that no page fault takes place, and, in the case that a page fault takes place, the data in the page-faulty page is retransmitted. The destination processor stores the logical page numbers of the page-faulty pages in the main memory to utilize the data retransmission. Furthermore, the destination processor confirms whether or not the page faults occur in the identical page and if that is the case, no interrupt is raised so as to avoid too frequent interrupts.

10 Claims, 11 Drawing Sheets

INTERPROCESSOR COMMUNICATION SYSTEM FOR PARALLEL PROCESSING

BACKGROUND OF THE INVENTION

The present invention relates to an interprocessor communication system to realize a virtual memory for a parallel computer system, in which a plurality of processors is interconnected through a network.

Interprocessor communication is imperative for parallel processing through which plural processors process a single job. Here, the interprocessor communication refers to a data exchange between plural processors. The interprocessor communication is created in the course of the parallel processing between the plural processors to ensure proper cooperation between them. For this reason, the interprocessor communication is one of the overheads in the parallel processing. Accordingly, a high-speed performance of an interprocessor communication is unavoidably required to promote the effect of the parallel processing.

When plural users handle a computer system made up of parallel processors, it has been common to employ a so-called space-sharing method. In this method, the computer system is spatially divided in such a manner that the processors are individually allotted to each of the users to permit each processor to serve for each user and that a job in charge of each user is allowed to run exclusively in his allotted processors.

In this method, however, there is a limitation that the total number of processors which execute each user's job cannot surpass the number of the physical processors.

As one solution to overcome the above-described limitation and thereby to allow plural users to efficiently handle the computer system, the time-sharing method has been employed to time-share each of the parallel processors in the computer system.

In order to execute timesharing, however, support of a virtual memory will be essentially required. Here, the virtual memory refers to an external storage medium such as a hard disk to save the memory images of the jobs allocated to the plural users.

The reason for requirement for a virtual memory is as follows:

A promotion in performance capability of a processor has brought about a striking increase in a data size that a processor can handle for a calculation in the field of science and technology. In many cases, the distribution of data necessary for parallel processing is effected by first transmitting the data from a hard disk or a host machine to one of the processors (referred to as a first processor below), subsequently dividing the data into data sections in the first processor and distributing the data sections individually to the other processors. While the main memory of each processor other than the first processor stores a divided data section, the main memory of the first processor will be likely to overflow if the size of the data loaded from the hard disk or the host machine is too large. To solve this problem, it is imperative to support (to realize on software) a virtual storage capable of handling data of a data size that is larger than the capacity of the real main memory, using an external storage medium such as a hard disk.

In order to support a virtual memory in a parallel computer system, a problem encountered has been that speed-up of the interprocessor communication adversely results in a relative slow-down of the processing speed when paging-in a paged-out page from the disk to a main memory. This entails a temporary suspension of the interprocessor communication to wait for paging-in of the following page. The suspension of the interprocessor communication between certain two processors affects problematic influences on the interprocessor communications between other processors.

FIG. 1 is an explanatory diagram of page-in in a conventional parallel computer system: (A) represents a real memory with the entire area set up for page-in; (B) represents a real memory with a communication buffer allocated; and (C) represents a real memory with transmission area first paged-in on the transmission side and a reception area next paged-in on the receiver side through interprocessor communications. By the methods represented in FIG. 1, (A) to (C), even when the concerned processor breaks an interprocessor communication to carry out a page-in processing, such a break will not interfere with the communications between other processors as described below.

The traditional method 1 shown in FIG. 1, (A) gives a solution in which no virtual memory is employed. In this solution, it is not permitted to use any area within the main memory exclusively for the interprocessor communication. Thus, all the programs including the interprocess communication programs can be allocated to any area of the main memory and the page-out of the program from the main memory is prohibited. This solution entails the problem that the solution does not meet the above-described requirement of supporting the virtual memory for the parallel computer system.

The traditional method 2 shown in FIG. 1, (B) teaches a transmission buffer and a reception buffer for the interprocessor communication fixedly allocated on the transmission side and on the receiver side, respectively. In this method, data for an interprocessor communication is always communicated exclusively through the transmission buffer and a reception buffer. In other words, all steps of the interprocessor communication are carried out in a real-memory-to-real-memory scheme and no step for page-management between the main memory and a virtual memory intervenes in the process of the interprocessor communication. In this way, the interprocessor communication can be performed without interruption by the page management. However, a problem encountered in this method has been that the method requires the steps of copying data from a virtual memory to the transmission buffer before the interprocessor communication and also copying data from the reception buffer to a destination address after the interprocessor communication, with the two copy steps causing a degraded performance of the interprocessor communication.

In the traditional method 3 shown in FIG. 1, (C), a transmission area and a reception area are allocated beforehand every time interprocessor communication is intended. While data can be sent to the destination address without necessitating copying in this method, a problem encountered has been that additional steps of the interprocessor communication are required between the processors of concern to confirm the allocation of the data reception area in the real memory on the receiver side. These steps for confirmation substantially cause a degraded performance of the interprocessor communication, although the method requires no copy step.

The above-described traditional methods are summarized as follows: the traditional method 1 cannot support a virtual memory; in the traditional method 2, the copying of data to the transmission buffer and the copying of data from the reception buffer to a destination address affect the interprocessor communication as an overhead that degrades significantly the performance of the interprocessor communication; and in the traditional method 3, an additional interprocessor communication is needed to execute the confirmation procedures to confirm an allocation of the transmission area and the reception area to the real memories on the transmitter side and the receiver side, respectively. These confirmation procedures have to be carried out every time the interprocessor communication is intended even when the allocation of the transmission area and the reception area is maintained. The above-described additional interprocessor communication causes degradation in the performance of the interprocessor communication.

The present invention is intended to solve the above-described problems. In particular, the present invention is directed to minimizing the procedures that cause deterioration of the performance in the interprocessor communication when the memory areas associated with the interprocessor communication have been allocated to the real memory, thereby offering an interprocessor communication system having an improved performance.

SUMMARY OF THE INVENTION

The present invention is directed to the interprocessor communication system for a parallel-computer system with plural processors combined through a network, each of the processors having a CPU, a main memory, a transmitter device and a receiver device, and communicating with other processors according to an interprocessor communication program in which a read address and a write address of transferred data are designated in terms of a logical address.

In order to attain the above-described object, each of the processors includes a translation means and a buffer means:

The translation means is provided in each of the transmitter device and the receiver device for translating a logical address to a physical address; and the buffer means is provided in a specific position on the main memory to store specific information concerning a fault page.

The specific position is designated both by the communication ID assigned to each task and by the source logical processor number of the processor from which a packet is sent.

The buffer means comprises: a flag section for storing flag information indicating an occurrence of the page fault during the interprocessor communication from a source logical processor to the task to which the communication ID is assigned; a field for entering the logical page number information of a page in which the latest page-fault takes place; a field for entering the number of logical pages in which page faults take place during the interprocessor communication concerned; and a field for entering an address information that indicates an area to store logical page numbers of page-faulty logical pages.

The interprocessor communication system described above enables the performance of programming without being conscious of the size of the area to be used for the interprocessor communication in the main memory. This is because, while the buffer means fixedly occupies the main memory, substantially any memory area can be used for the interprocessor communication programs and can be managed under the virtual memory concept. Thus there is no need to restrain the area in the main memory for use in the interprocessor communication, as with the case of the traditional method 3 described above.

Preferably, the main memory is further provided with a fault-page list for storing said logical page numbers of page-faulty logical pages. If the address translation made by the translation means provided in the receiver device results in the state of page-out, then the translation means stores the data concerning the result of the address translation in the section and fields of the buffer means, and enters the logical page number of the logical page that is subjected to the address translation into the fault-page list. In addition, it is preferred that, if the result of said address translation indicates the state of a page indicative of page-out, the logical page subjected to the address translation is assigned to a dummy physical page designated beforehand.

This constituent feature offers an advantage of preventing the network from being blocked even when a page fault takes place. This is because writing data to a page-faulty page results in writing the data to dummy page through an ordinary data-receiving processing. The page-faulty data can be thrown away by discarding the dummy page.

In the interprocessor communication system, the translation means preferably has, as information of a logical page that constitutes a part of each logical address, a physical page number of the physical page assigned to the logical page and the state of the physical page, wherein the state of the physical page comes in the following specific state of the page:

(i) the state of "invalid" in which the translated physical page is not assigned to the main memory;

(ii) the state of "page out" in which the translated physical page is currently absent in the main memory and is paged out to an external storing medium;

(iii) the state of "on paging-in" in which the translated physical page was previously in the state of "page out" and is currently in page-in processing;

(iv) the state of "page in" in which the translated physical page has been assigned to the main memory.

This constituent feature enables the treatment of a page fault without deteriorating the performance of the interprocessor communication. This is because the state of logical page is classified into the states of "invalid", "page-out", "on page-in" and "page-in", thereby enabling the confirmation of the page fault to be performed smoothly.

In the interprocessor communication system of the present invention, it is preferred that the translation means has entries of communication IDs, logical page numbers of logical pages, the physical page numbers of the physical pages assigned to the logical page and the states of the physical pages. The translation means is also provided with comparison means for comparing the communication ID and logical page to be translated with the entry communication IDs and the entry logical page numbers, respectively. Based on the comparisons, the translation means provides outputs of the physical page number corresponding to the logical page number of the logical page to be translated and also the state of the physical page. During an interprocessor communication, the translation means on the receiver side translates a received communication ID that corresponds to a task and a received logical page number to the corresponding physical page number and the state of the physical page.

The receiver device is preferably provided with a second comparison means for comparing the logical page number to be translated with the logical page number entered in the buffer means to judge whether or not the logical page number to be translated coincides with the logical page number of the latest page-faulty logical page. In the case that the translation means indicates, as the state of the physical page assigned to the logical page to be translated, the state of "on page-in processing", if said second comparison means judges it as being coincident, then the receiver device performs no processing. In the same case, if the second comparison means judges it as being incoincident, then the receiver device raises interrupt in order to ask the OS to add the logical page number to be translated to the fault-page list to store the logical page number of concern as the latest page-faulty logical page and to increase the number of the page-faulty page entered in the field for entering the number of logical pages in the buffer means by 1.

The constituent features described in the previous paragraph allow fewer interrupts to be raised by the receiver device even when page faults take place. This is because comparing the logical page number of the latest page-faulty page entered in the buffer means with the logical page number of concern obviates the necessity of plural interrupts to treat the page fault of the same page.

The source processor preferably transmits a check packet after one data is transmitted. The header of the check packet has a format including a field to enter a swapping data and also a field to enter a write address for a reply packet in reply to the check packet. The destination processor, when receiving the check packet, swaps the swapping data with the entry of said buffer means to provide a reply to the check packet and returns the reply to the source processor to store the entry of the buffer means in the area of the main memory designated by the write address.

Further it is preferred that the source processor has means for checking whether or not a page fault takes place on the reception side of the interprocessor communication in the latest data that has been transmitted from the source processor.

The features described in the last two paragraph above allow the obviation of the deterioration in the performance of the interprocessor communication caused by the confirmation procedure of the page faults. This is because the confirmation of the page faults is carried out only once after a great amount of data has been sent and also because the receiver device carries out the packet processing to confirm the occurrence of the page fault at a high speed.

It is preferred that the fault-page list stores the number of the page-faulty logical page successively entered when the page fault occurs during the interprocessor communication of concern. The source processor reads the fault-page list by means of a remote read protocol, and retransmits exclusively the data of the logical page number entered in the fault-page list.

The feature described in the preceding paragraph above offers an advantage of enabling the reduction of a load of the OS when a page fault takes place. This is because using the remote read protocol allows the user task to read the fault-page list and to resend the data that has not been received due to a page fault without any operation of the OS.

It is preferred that after the retransmission, the source processor confirms presence or absence of a page fault and repeats the retransmission until the processor confirms absence of the page fault.

The above and other objects, features and advantages of the present invention will become apparent from the following description referring to the accompanying drawings which illustrate an example of a preferred embodiment of the present invention. dr

DETAILED EXPLANATION OF PREFERRED EMBODIMENT

Figure 1:
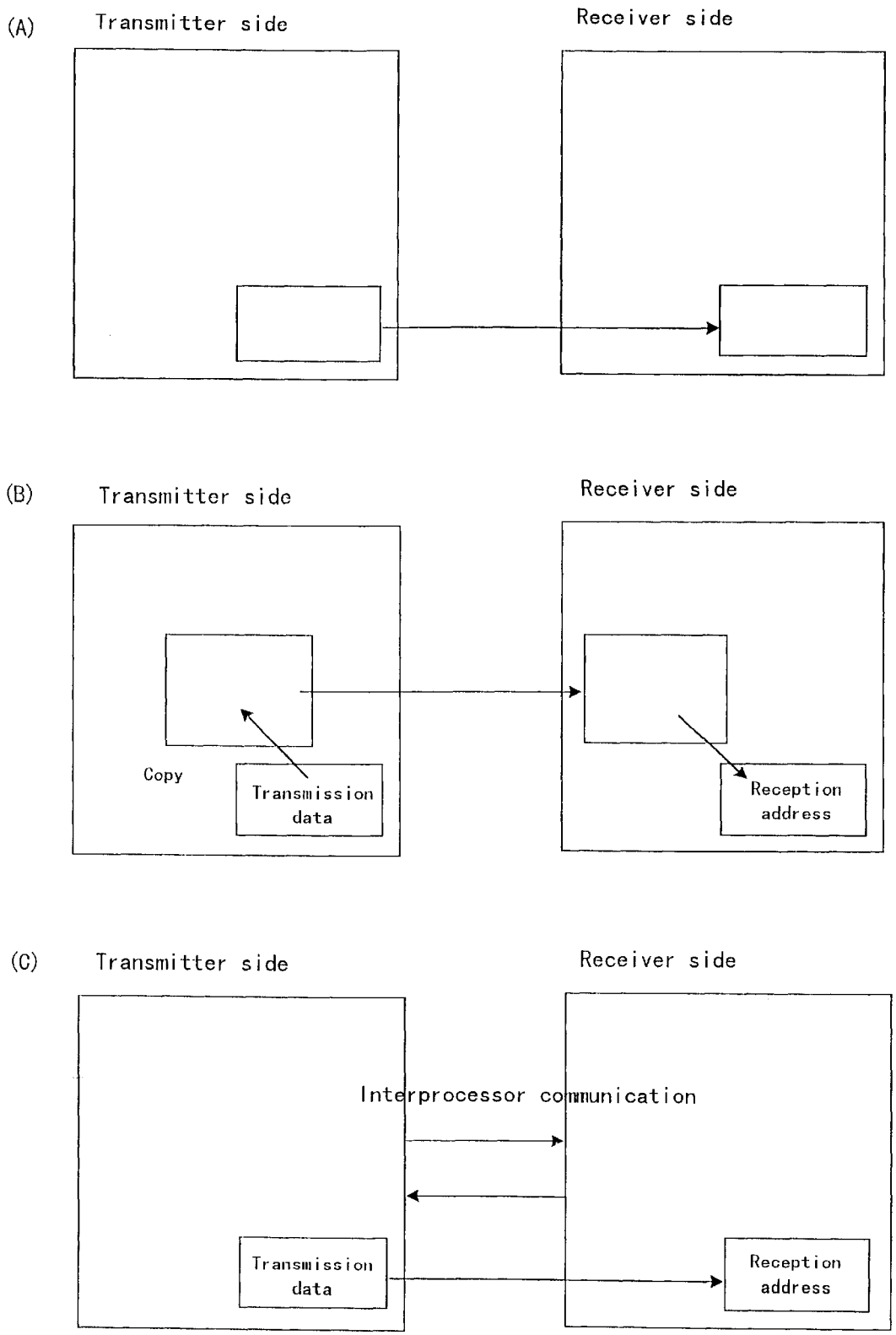
FIG. 1 is an explanatory diagram of page-in in a conventional parallel computer system.
Figure 2:
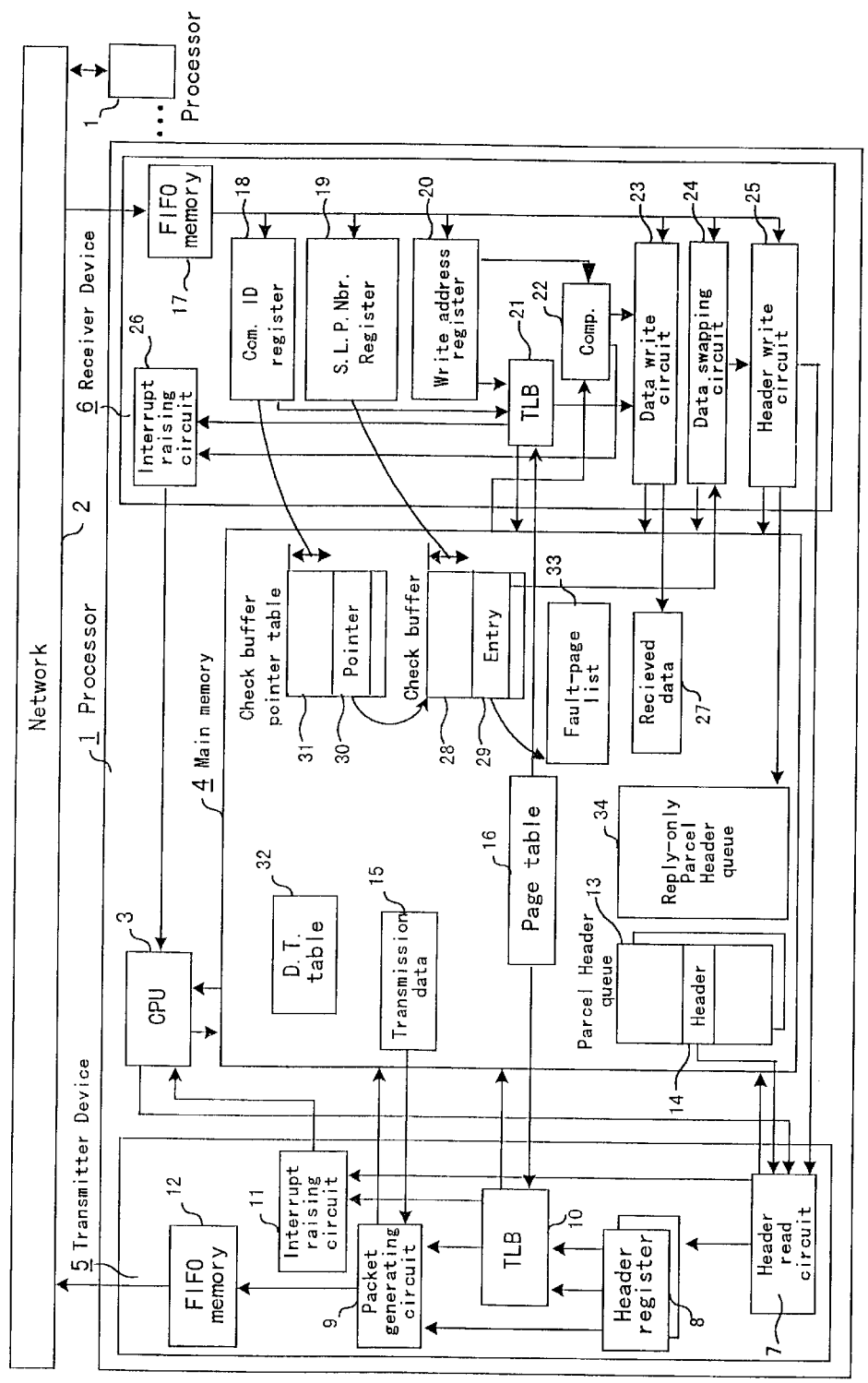
FIG. 2 is a block diagram to illustrate an embodiment of the present invention.

The embodiments of the present invention are now set forth with reference to the drawings. FIG. 2 is a block diagram to illustrate an embodiment of the present invention. As is shown in FIG. 2, the parallel computer system is made up of plural processors 1 connected to network 2. Each processor comprises CPU 3, main memory 4, transmitter device 5 and receiver device 6. Transmitter device 5 comprises header read circuit 7, header register 8, packet generating circuit 9, TLB 10, interrupt raising circuit 11 and FIFO memory 12.

Header read circuit 7 reads header 14 from parcel header queue 13 provided in main memory 4, checks the content of the header and stores the header 14 in header register 8 if the header has no error.

Packet generating circuit 9 selects one header 14 from plural headers registered in head register 8, which leads the next packet properly to the destination processor. In this way, packet generating circuit 9 produces a header for a packet next to be sent to network 2 using the selected header 14; TLB 10 carries out translation of the source address written in the header from a logical address to a physical address; packet generating circuit 9 requests main memory 4 to read the data to be transmitted (referred to as transmission data 15) that is stored in the physical address in the main memory 4 (the physical address is supplied from TLB 10 as described below) and delivers the read transmission data to network 2 as packets.

TLB 10 translates a logical address to a physical address based on the communication ID and the source address entered in header register 8. While information necessary for the address translation is cached in TLB 10 beforehand, TLB 10 accesses page table 16 in main memory 4 and also gives rise to an interrupt to request the OS for an allocation of a page, if necessary. In this way, TLB 10 can obtain necessary information for executing the address translation.

FIFO memory 12 is interposed between network 2 and packet generating circuit 9 to serve to change a data width, or to produce an error-detecting code. Interrupt raising circuit 11 operates to cause CPU 3 to start an interrupt routine when header read circuit 7 detects an error while checking the read header, or TLB 10 needs to request the OS to provide new page information.

Receiver device 6 comprises FIFO memory 17, communication ID register 18 (referred to as com. ID register 18 in FIG. 2), source logical processor number register 19 (referred to as S.L.P. Nbr register 19 in FIG. 2), write address register 20, TLB 21, comparator 22 (referred to as Com. 22 in FIG. 2), data write circuit 23, data swap circuit 24, header write circuit 25 and interrupt raising circuit 26.

FIFO memory 17 preliminarily stores packets sent from the network 2. Communication ID 18 stores the communication ID included in the header of the packet. Source logical processor number 19 (referred to as S.L.P. Nbr 19 in FIG. 2) stores the logical number of the processor that transmitted the packet. Write address register 20 stores the write address (the destination address) of the data contained in the packet. The write address is entered in the packet header of the received packet.

Based on the communication ID stored in communication ID register 18 and the destination logical address stored in write address register 20, TLB 21 translates the logical address into a physical address and delivers the physical address to data write circuit as a physical write address. While information necessary for the address translation is cached in TLB 21 beforehand, TLB 21 accesses page table 16 on main memory 4 and also gives rise to an interrupt to request the OS for an allocation of a page, if necessary. In this way, TLB 21 can obtain necessary information for executing the address translation.

Data write circuit 23 writes the received data 27, or the data sent by packet, to that physical address in main memory 4 which is provided by TLB 21. Data swap circuit 24 swaps the swap data with entry 29 of check buffer 28 in main memory 4. The packet, as will be described with reference to FIG. 4, includes the swap data. The entry 29 is hereinafter referred to as a check buffer entry 29.

Header write circuit 25 generates a reply parcel header in reply to the received packet from both the data supplied from data swap circuit 24 and the information included in the received packet, and writes the reply parcel header to reply-only parcel header queue 34 in main memory 4. Header write circuit 25 then sends a transmission request to header read circuit 23 in transmitter device 7 of the destination processor.

Comparator 22 (referred to as comp. 22 in FIG. 2) compares a part of the write address (i.e. the logical page number) stored in write address register 20 with a part of check buffer entry 29 on main memory 4 (i.e. the logical page number of the latest page-faulty page) and stores the result of comparison to data write circuit 23 or gives rise to an interrupt by means of interrupt raising circuit 26 if necessary.

Interrupt raising circuit 26 causes CPU 3 to raise an interrupt in the case that the comparison result by comparator 22 exhibits necessity of the interrupt or that TLB 21 needs to request the OS for management when TLB 21 translates the write address from a logical address to a physical address.

Check buffer pointer table 31 is provided in main memory 4 to store pointer 30 for pointing check buffer 28 for each communication ID. Receiver device 6 looks up check buffer pointer table 31 to obtain the pointer corresponding to the communication ID of concern, thereby accessing check buffer 28 corresponding to the communication ID. With reference to the source logical processor number stored in source logical processor number register 19, receiver device 6 of the destination processor can read check buffer entry 29 corresponding to the communication ID and the source logical processor number concerned.

Destination transformation table 32 is provided in main memory 4 and is looked up when header read circuit 7 transforms a destination logical processor number to a destination physical number and a communication ID. Fault-page list 33 is provided in main memory 4 to store the logical page numbers of page-faulty pages.

A parcel and a packet used in the communication between parallel processors will be next explained. A parcel is a unit of communication, and the items in the header 14 of the parcel are written to a parcel header queue 13. Header read circuit 7 transforms the destination of the parcel header from a logical processor number to a physical processor number and a communication ID by means of destination transformation table (D.T. table) 32 provided in main memory 4. The physical processor number and the communication ID are saved in header register 8. A packet, on the other hand, is a communication unit that flows in a network. The capacity of the packet is limited depending on, for example, the capacities of FIFO memories provided in switches in the network 2. The data of one parcel, when transmitted, is divided into plural packets by packet-generating circuit 9.

Figure 3:
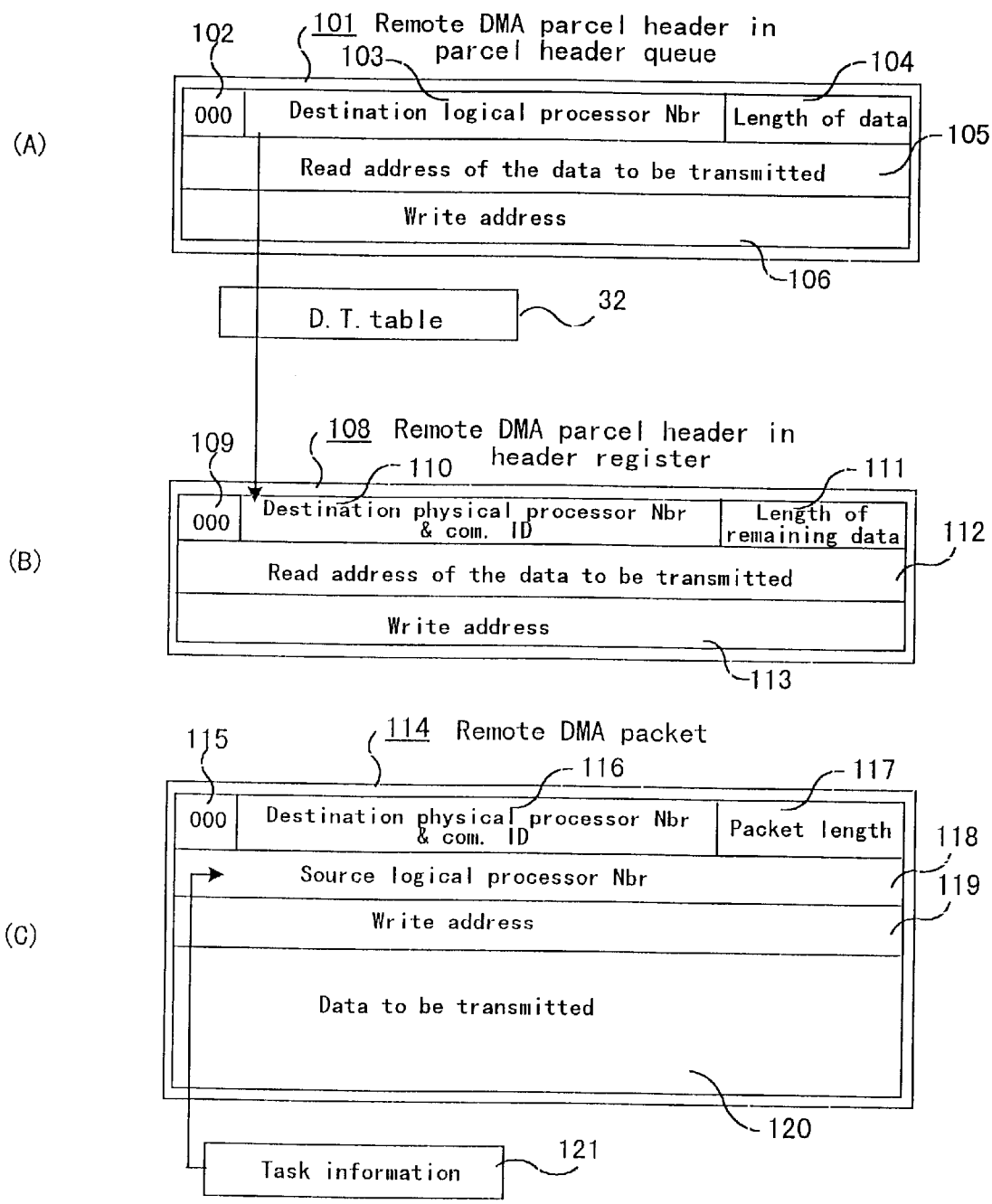
FIG. 3 represents the formats of a remote DMA parcel header for a communication in the parallel computer system.

FIG. 3 represents formats of a remote DMA parcel header for a communication in the parallel computer system. (A) represents the format of the header in the parcel header queue 13, (B) represents the format of the header in header register 8 and (C) represents a format of the remote DMA packet.

The remote DMA parcel having a header shown in FIG. 3(A) is capable of transferring the data of data length 104. The data can be transmitted from read address 105 of main memory 4 in a source processor to write address 106 of main memory 4 in a destination processor 1 designated by destination logical processor number 103. There is provided a code section at the top of parcel header 101 of the remote DMA. "000" written in code section 102 indicates that the parcel header of concern is a header of remote DMA.

Parcel header 101 of remote DMA is read from parcel header queue 13 by header read circuit 7 and is written to header register 8 after destination logical processor number 103 of the parcel header 101 is transformed into destination physical processor number and communication ID as is shown in FIG. 3(B). This logical-to-physical processor number transformation is carried out in header read circuit 7 by using destination transformation table (D. T. table) 32.

Packet generating circuit 9 generates remote DMA packet 114 from both remote DMA parcel header 108 stored in header register 8 and information 121 of the task of concern. The remote DMA packet 114 is made up of code section 115 entered with "000" to indicate the remote DMA, destination physical processor number and communication ID 116, packet length 117, source logical processor number 118, write address 119 and transmitting data 120. In remote DMA packet as well, write address 119 refers to the address of main memory 4 in the destination processor to which the transmitted data is written.

In addition, packet generating circuit 9 determines packet length 117 from remaining data length 111, read address 112 and write address 113 described in the remote DMA parcel header 108 stored in header register 8. Remaining data length 111, read address 112 and write address 113 described in remote DMA parcel header 108 are updated every time when one packet is sent. In this way, packet generating circuit 9 sends a packet until remaining data length 111 becomes zero.

In order to avoid occurrence of a page fault halfway through transmitting or receiving one packet, packet generating circuit 9 does not generate a packet that straddles page boundaries of a read address and a write address. In other words, packet generating circuit 9 determines packet length 117 so that a packet can always be broken off at a page boundary of a read address 112 and a write address 113.

A parcel of check packets is next explained.

Figure 4:
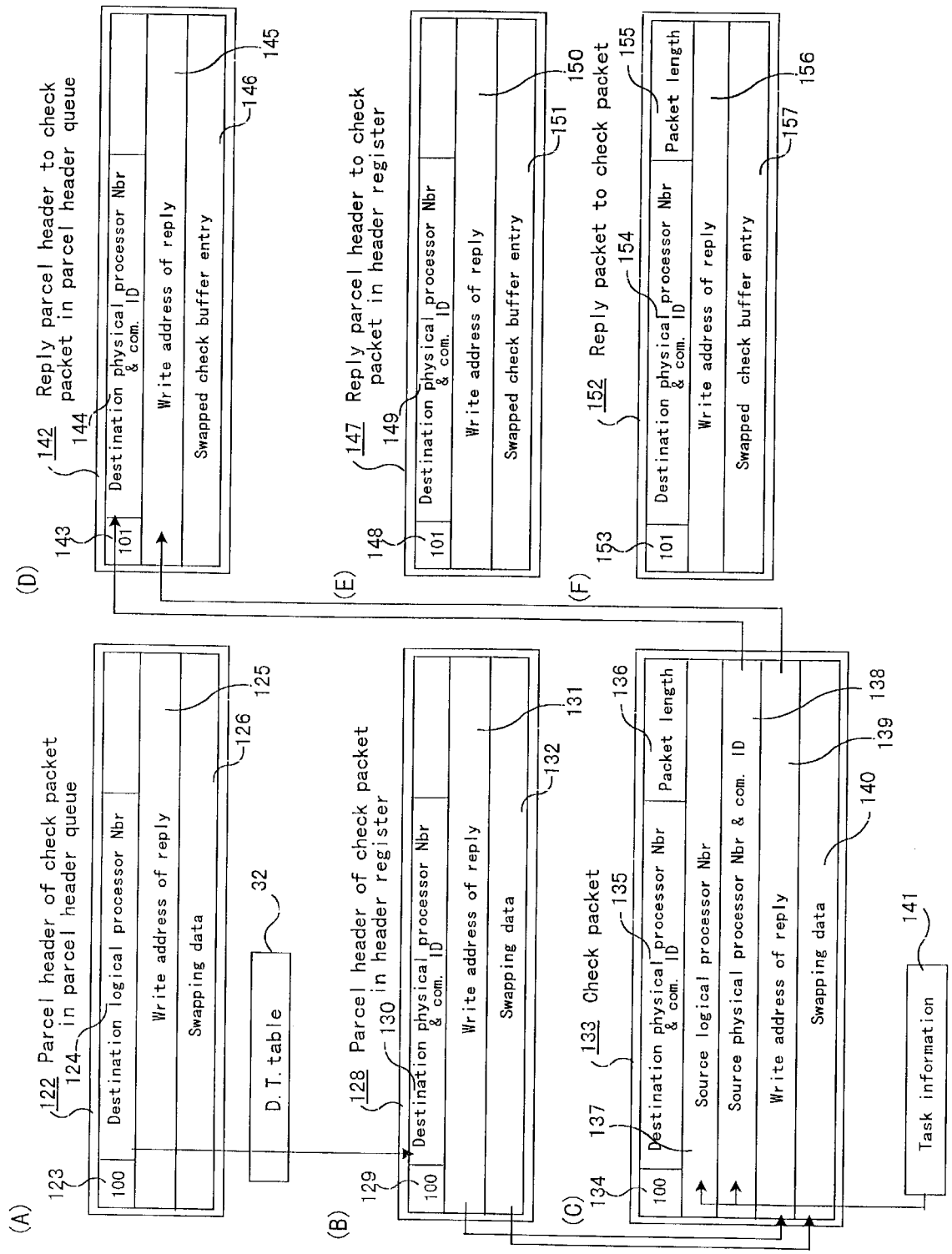
FIG. 4 shows the format diagrams of a parcel of a check packet and the reply parcel in reply to the check packet.

FIG. 4 shows format diagrams of a parcel of a check packet and a parcel of the reply (the reply parcel) to the check packet that are communicated in the parallel computer system concerned: (A) represents a format of a parcel header of a check packet in parcel header queue 13; (B) represents a format of a parcel header of a check packet in header register 8; (C) represents a format of the check packet; (D) represents a format of the reply parcel header in reply to the check packet in parcel header queue 34; (E) represents a format of the reply parcel header in reply to the check packet in header register 8; and (F) represents a format of the reply parcel in reply to the check packet.

A check packet has a parcel header including a swapping data field and a field of a write address for a reply parcel of a check packet. The write address refers to an address in main memory of the source processor to which the reply parcel is written. The swapping data field is allotted to swapping data 126 to be swapped with a predetermined value stored in a specified address (a check buffer entry) in the destination processor when it receives the packet from a source processor. The destination processor produces a reply parcel to send to the source processor, wherein the check buffer entry is entered in the reply parcel.

Referring to FIG. 4, a parcel header of a check packet 122 in the parcel header queue in the source processor comprises code section 123, field of destination logical processor number 124, field of write address 125 and field of swapping data 126. "100" is entered in the section 123 indicating that the parcel is a parcel of a check packet. Write address field 125 is for writing a reply to a check packet as described above. In the parcel header of a check packet parcel 122 as well, destination logical processor number 124 is transformed into destination physical processor number and communication ID 130 using destination transformation table 32 before it is written in header register (cf. FIG. 4(B)).

Packet generation circuit 9 of the source processor generates check packet 133 from both parcel header 128 of the check packet in header register 8 and the information of the task 141 of current concern, wherein the check packet 133 has code section 134 and the fields of destination logical processor number and communication ID 135, packet length 136, source logical processor number 137, source physical processor number and communication ID 138, write address for a reply 139 and swapping data 140. "100" entered into code section 134 designates the sort of packet being a check packet. Source logical processor number 137 and source physical processor number and communication ID 138 are the information included in the task of current concern. Destination physical processor number and communication ID 130, write address for a reply 131 and swapping data 132 included in parcel header for check packet 128 are entered as is in the corresponding fields 135, 139 and 140 of check packet 133, respectively. Parcel header for check packet 128 stored in header register 8 is transmitted infallibly as one check packet 133.

Next, reply parcel header for check packet 142 will be set forth with reference to FIG. 4. Reply parcel header 142 is formed from check packet 133 by swapping the swapping data 140 with check buffer entry through data swapping circuit 24 in receiver device 24 of the destination processor and also from the information described in check packet 133. Reply parcel header 142 is stored in reply-only parcel header queue 34 in main memory 4 by means of header write circuit 25 of the destination processor.

As a result, reply parcel header 142 in reply to a check packet stored in reply-only parcel header queue 33 in the destination processor has code section 143 and the fields of destination physical processor number and communication ID 144, reply write address 145 and check buffer entry 146. The code "101" is entered in code section 143 to designate a reply check packet. Source physical processor number and communication ID 138 of check packet 133 are entered as is in the field of destination physical processor number and communication ID 144. Reply write address 139 is entered as is in the field of reply write address 145. Check buffer entry 146 is an entry 29 of the check buffer in main memory 4 swapped for swapping data 140 of check packet 133.

Header read circuit 7 in the destination processor reads reply parcel header 142 in reply to check packet 133 from reply-only parcel header queue 34 and confirms code section 143 being entered with code "101" that designates the reply to the check packet 133. Since destination physical processor number and communication ID 144 is entered in reply parcel header 142 instead of a destination logical processor number, header read circuit 7 stores the reply parcel header 142 to header register with no change (cf. FIG. 4(E)). This is unlike the case of other parcel headers such as parcel header 101 in a remote DMA and parcel header 122 of a check packet. It is to be noted that reply parcel header 142 can be used as is without any problem in this case, because reply parcel header 142 is formed by header write circuit 25 in receiver device 6 on the basis of source physical processor number and communication ID 138 formed by packet generating circuit 9 in transmitter device 5 of the source processor and is written in specific parcel header queue 34 that is inaccessible by any user task.

Packet generating circuit 9 of the destination processor forms reply packet 152 from reply parcel header 147 and sends the reply packet 152 to the network. In this way, reply parcel 147 as well is transmitted always as one reply packet 152.

Figure 5:
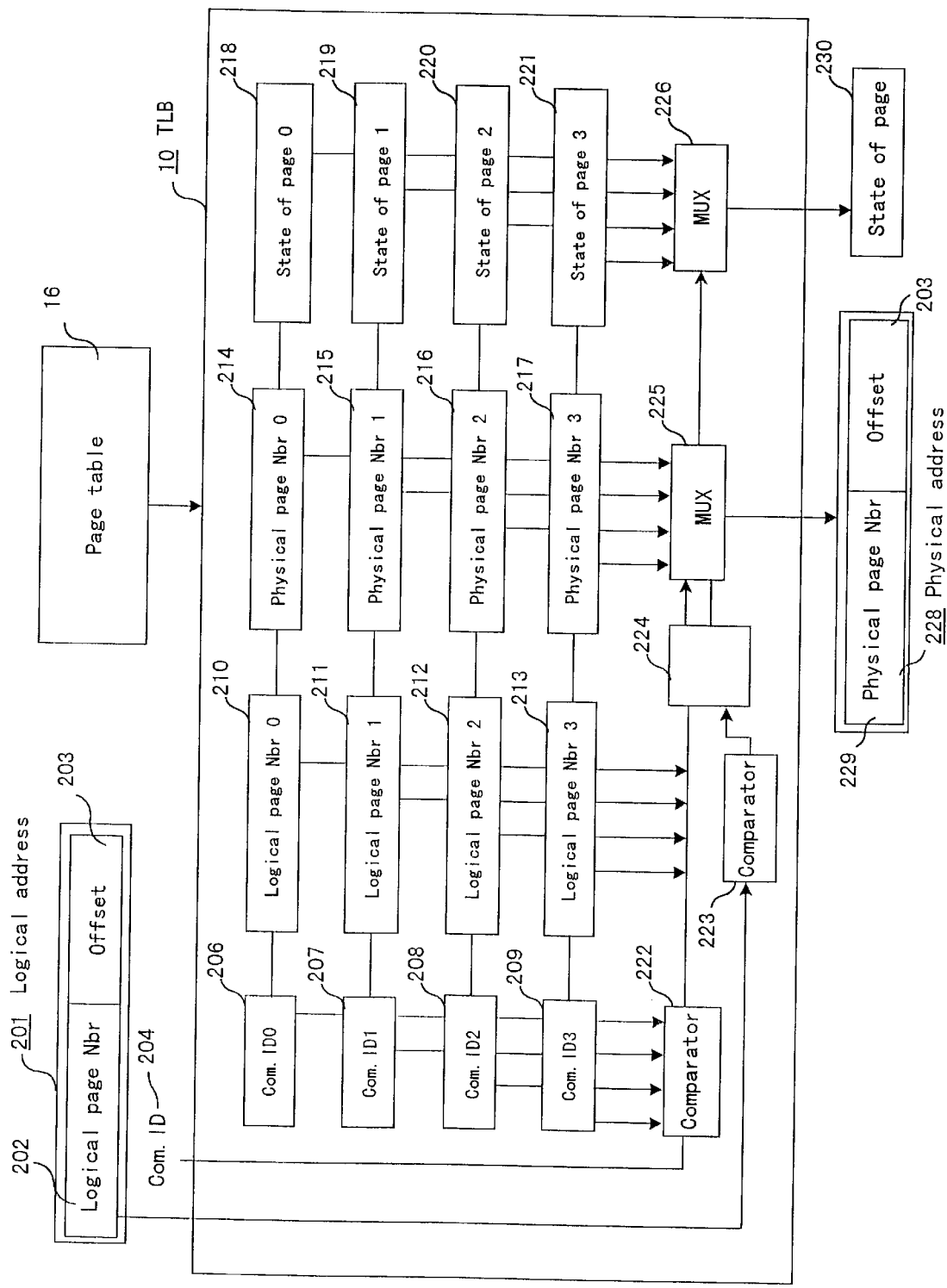
FIG. 5 is a block diagram to illustrate details of TLB.

Address transformation performed by TLBs 10 and 21 will next be set forth with reference to FIG. 5. FIG. 5 is a block diagram to illustrate details of TLB 10. TLB 21 has a similar structure to TLB 10. Referring to FIG. 5, logical address 201 is made up of logical page number 202 and offset 203. In TLB 10, physical page number 229 and state of page 230 are looked up from logical page number 202 and communication ID. In this embodiment, TLB 10 includes four entries. Four entries of communication IDs 206–209 and four entries of logical page numbers 210–213 are each compared with given communication ID 204 and logical page number 202 by means of comparators 222 and 223, respectively. MUX 225 selects a physical page number and a state of page from physical page number entries 214–217 and state of page entries 218–221 so that the communication ID and the logical page number corresponding to the physical page number and the state of page will individually coincide with the given communication ID 204 and logical page number 202. For this end, comparator 222 compares communication ID entries 206–209 with given communication ID 204, and comparator 223 compares logical page number entries 210–213 with given logical page number 202. Selector 224 provides a selection signal depending on the entered comparison results. MUX 225 and MUX 226 provide outputs of physical page number 229 and state of page 230, respectively, according to the received selection signals. In this way, a logical page number can be transformed into the physical page number.

In case that none of the four entry sets of the communication ID and logical page number do not coincide with the specified communication ID 204 and logical page number 202, TLB 10 accesses page table 16 on main memory 4 to have the page information concerned entered as one of the four entries thereof. Should page table 16 not have the page information of concern either, TLB10 requests an interrupt to the OS to have new page information established in page table 16.

Various constitutions can be intended concerning page table 16 on main table 4. The simplest is the table in which an offset is defined as a combination of communication ID 204 and logical page number 202. In view of an operation efficiency of main memory 4, however, it is preferable to define a logical address as a combination of segment number, logical page number 202 and offset 203 rather than to define it as a combination of logical page number 202 and offset 203 alone, and provide page table for each segment.

In the above-described embodiment, it is necessary to define the state of page 230. The state of page can be defined as described below.

"00" indicates an invalid page. Since the page of concern can be a newly accessed page as the case may be, an interrupt is caused to request the OS to allot the physical page.

"01" indicates the state in which the page of concern is paged out and thus absent in main memory 4. In this state as well, an interrupt is caused to request the OS to allot the physical page.

"10" indicates the state in which the page of concern was paged out and is now on paging-in. In this state, no interrupt is caused.

"11" indicates the page of concern being paged-in in main memory 4.

Figure 6:
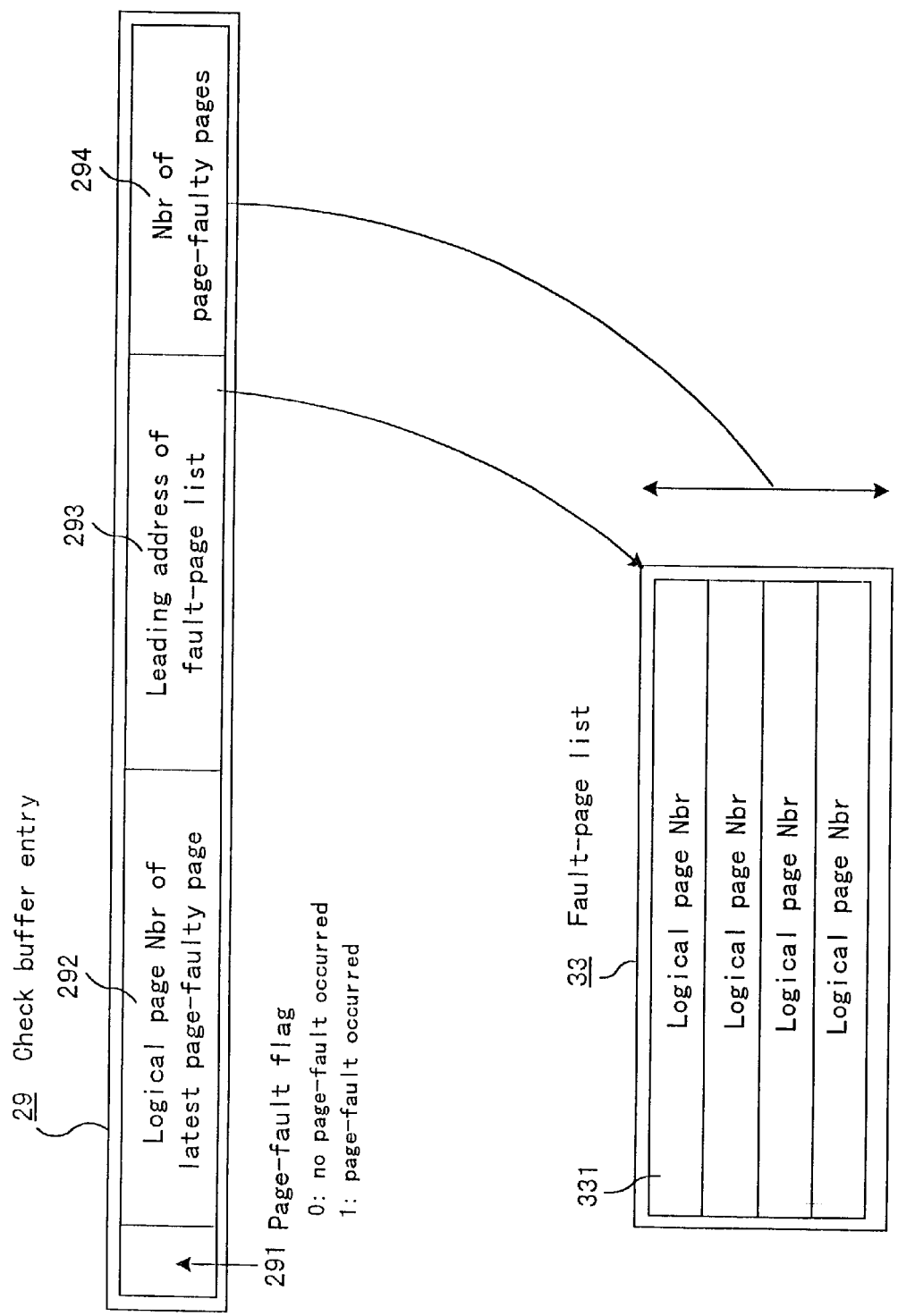
FIG. 6 is a diagram to illustrate the check buffer entry formats.

Check buffer entry 29 will next be set forth referring to FIG. 6.

Check buffer entry 29 stores: page-fault flag 291 that indicates occurrence of a page fault; the logical page number of the latest page-faulty page; the number of fault pages 294; and leading address 293 of fault-page list 33. Page-fault flag 291 exhibits "0" in the case that no page-fault has occurred yet and "1" in the case that at least one page-fault has already occurred.

Fault-page list 33 will next be explained.

Fault-page list 33 is provided one for each check buffer entry 29 with its leading address 293 written in check buffer entry 29. The logical page number of page-faulty logical page 331 is written in fault-page list 33. The size of fault-page list corresponds to the number of page-faulty pages 294 in check buffer entry 29. Since the maximum amount of data transmittable under a single parcel header is limited, the upper limit of the size of fault-page list 33 amounts to (the amount of data transmittable under one parcel header)÷(the size of one page).

The method of the interprocessor communication according to the present invention will next be explained.

First of all, it is presumed that a unit of the communication is a parcel, as described above. One remote DMA parcel allows communicating the data of a limited size of successive addresses. In the present embodiment, a data size that is transmittable by one remote DMA parcel is presumed to be 512 kbyte and the size of one page to be 4 kbyte. The maximum size of fault-page list 33 thus corresponds to 128 pages. The area of fault-page list 33 can be ruled out from page-out to the virtual memory by declaration and kept fixedly in a "state of page-in" (i.e. the fault-page list can be designed so that the faulty-page number in the fault-page list will not be paged out to the virtual memory and always kept within main memory 4).

In the present invention, a parcel of a check packet is sent directly after each remote DMA parcel is transmitted.

Figure 7:
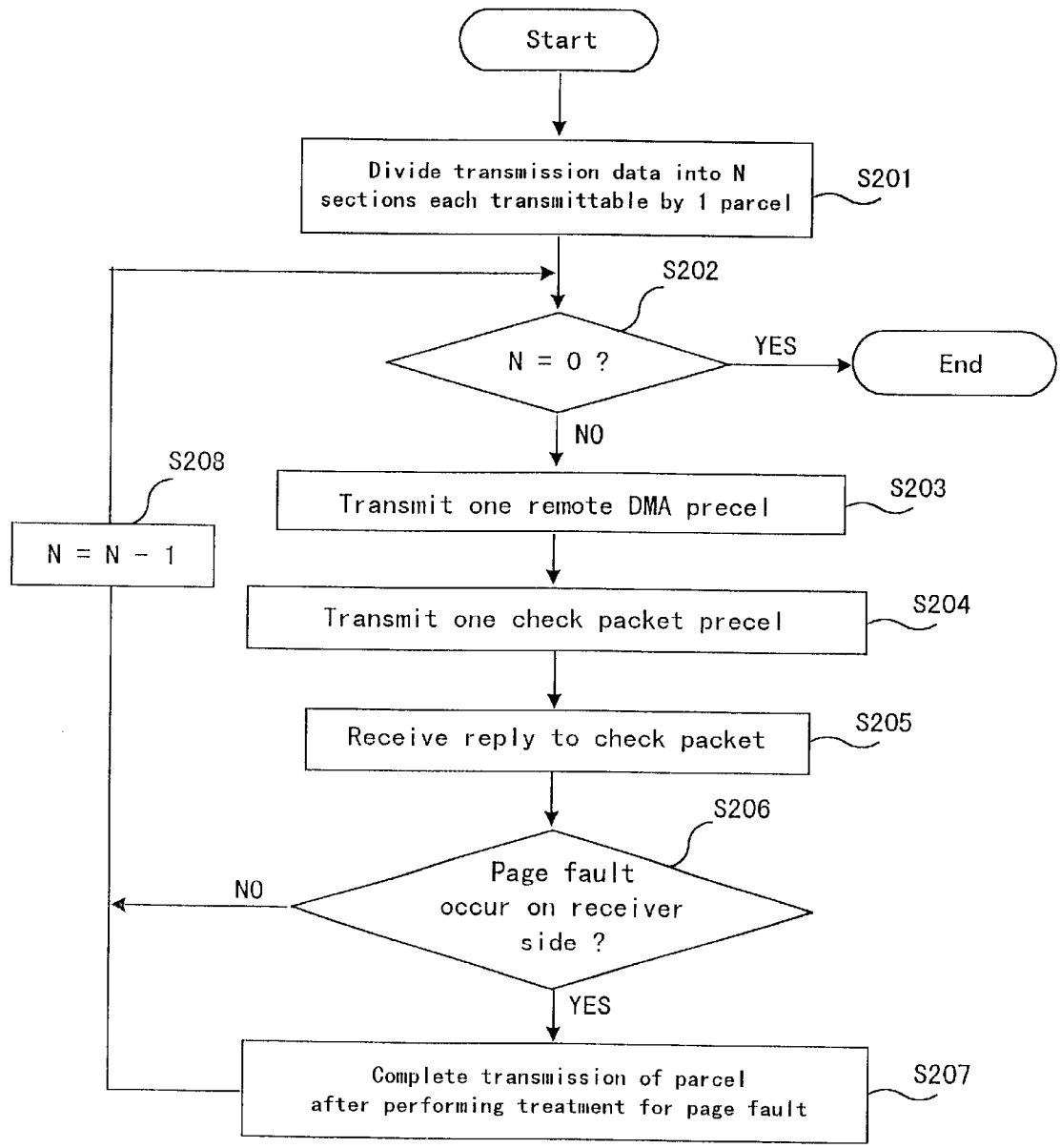
FIG. 7 is a flow chart illustrating a procedure described in the communication library according to the present invention.

FIG. 7 is a flow chart illustrating a procedure described in the communication library according to the present invention. The library divides the data to be transmitted (transmission data) into N section in such a manner that each section may have a size transmittable by one parcel (step S201). Next, it is judged whether or not N is 0 (step S202). If not, one remote DMA parcel is transmitted (step S203), directly thereafter followed by transmission of one parcel of a check packet (step S204). The swapping data sent with the check packet is entered, as an initial value, in check buffer entry 29 with page-fault flag 291 indicating 0.

The library waits for a reply to the check packet (step S205). The reply involves check buffer entry 29 that indicates a possible occurrence of a page fault at the reception time of the remote DMA parcel of immediately preceding transmission.

The library inspects page-fault flag 291 in check buffer entry 29 (step S206). In case that the flag 291 indicates an occurrence of a page fault, the library executes predetermined processing and competes the transmission of the remote DMA parcel (step S207).

The processing of the page fault is directed to accurate reception of the data transmitted by means of a remote DMA parcel and the processing will be explained later.

In case that the flag 291 indicates an occurrence of no page fault, on the other hand, the library executes nothing about the page fault. In this case, the library reduces N by 1 (step S208). The procedure from step S202 to step S208 is repeated until N becomes 0.

Figure 8:
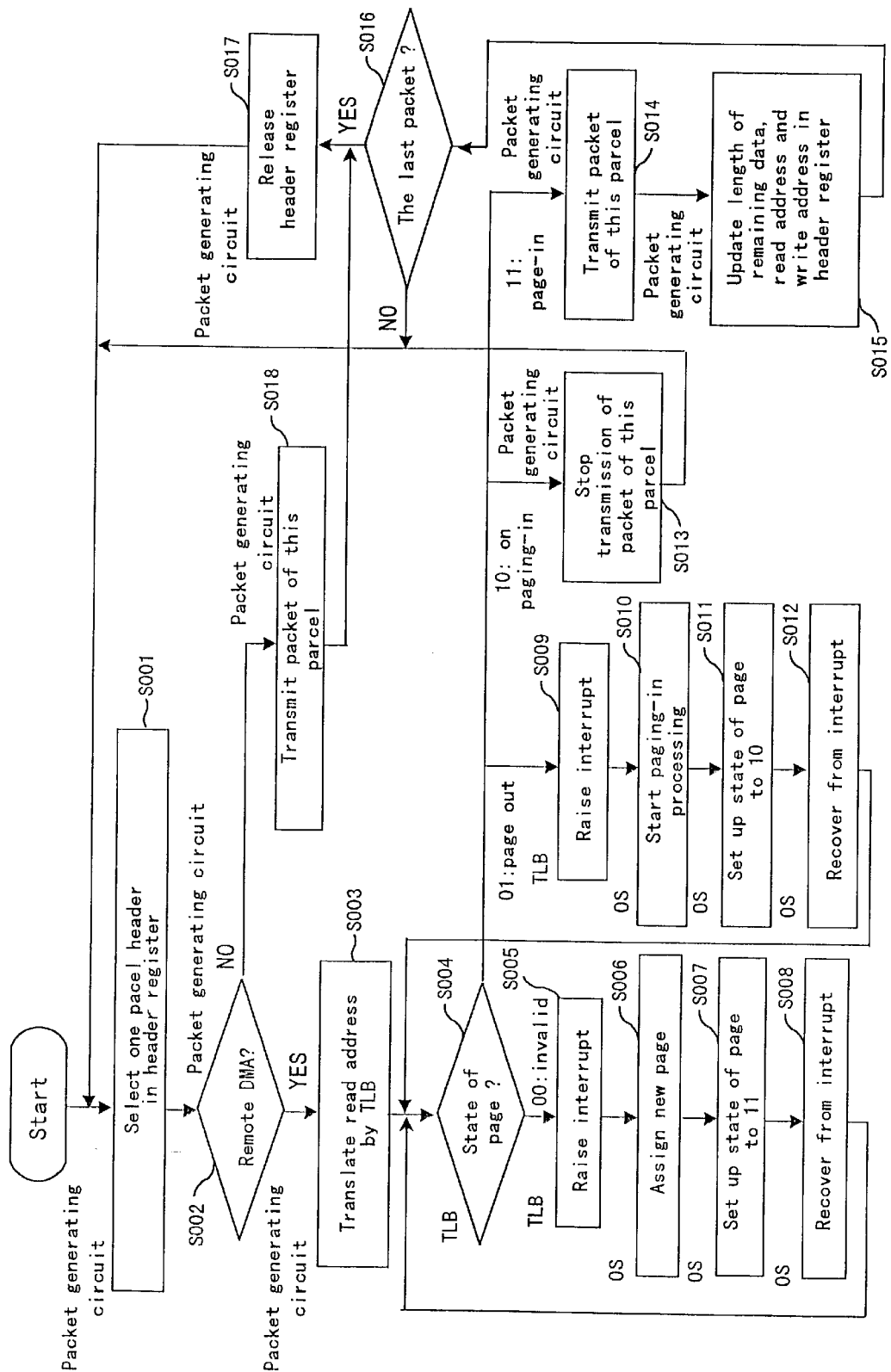
FIG. 8 is a flow chart to illustrate the processing of the page fault on the transmitter side.

Now, the processing of the page fault at the time of transmission will be set forth referring to FIG. 2, FIG. 3 and FIG. 8. Packet generating circuit 9 in transmitter device 5 selects one of the parcel headers in header register 8 (step S001) and generates a packet having the parcel header. In case that the parcel header is a remote DMA parcel header (step S002), packet generating circuit 9 transforms the read address of the transmission data included in the header into a physical address using TLB 9 (step S0003) and checks state of page 230 (step S0004).

If the state of page 230 is invalid "00", then TLB gives rise to an interrupt (step S0005) to have a new page allotted by OS (0006). (In an ordinary case, because CPU generates the data to be transmitted beforehand, there are very few instances where the state of page 230 in the read address is "00".) The OS makes state of page 230 "11" (step S007) and recovers TLB 10 from its state of interrupt (step S008). TLB 10 repeats a check of the state of page 230 (step S004).

If TLB 10 finds state of page 230 exhibit page-out "01", then TLB 10 gives rise to an interrupt (step S009) to have the OS start processing of paging-in (step S010). The OS rewrites state of page 230 to "10" indicative of "on paging-in" (step S011). The OS makes TLB 10 recover from its state of interrupt (step S012). TLB 10 repeats a check of the state of page 230 (step S004).

If TLB 10 finds state of page 230 indicating the state of "on paging-in 10", then TLB 10 notifies the content of state of page 230 to packet generating circuit 9 without giving rise to an interrupt. Packet generating circuit 9 stops transmission of the packet of the parcel header (step S013), because the data for the packet is in the state of "on paging-in", and selects another parcel header to attempt transmission of the parcel header (step S001).

If TLB 10 finds state of page 230 indicating page-in "11", then TLB 10 notifies the content of state of page 230 to packet generating circuit 9 without giving rise to an interrupt. Packet generating circuit 9 accesses the transmission data 15 and sends the packet of concern (step S014). Packet generating circuit 9 then updates the length of remaining data 111 (cf. FIG. 3) of remote DMA parcel header 108 in the header register, the read address 112 and the write address 113 based on the packet length (step S015) and checks whether or not the transmitted packet is the last of the packets to be sent or whether or not the length of remaining data 111 is 0 (step S016).

If the transmitted packet is not the last packet, then packet generating circuit 9 selects a parcel header to transmit the next packet (step S001). If the transmitted packet is the last packet, then packet generating circuit 9 erases this parcel header from header register 8 to release the register 8 (step S017) and selects the parcel header of the packet to be next transmitted (step S001).

If packet generating circuit 9 selects a parcel header that is not of a remote DMA parcel, in other words, if packet generating circuit 9 selects either the parcel header of a check packet or the parcel header of a reply to a check packet, an address translation is not required. In this case, packet generating circuit 9 sends the parcel of the selected header as is. Since such a parcel makes up only one packet, packet generating circuit 9 erases the parcel header from header register 8 and releases header register 8 (step S017) after transmission of the parcel. Packet generating circuit 9 selects the next parcel header (step S001).

Figure 9:
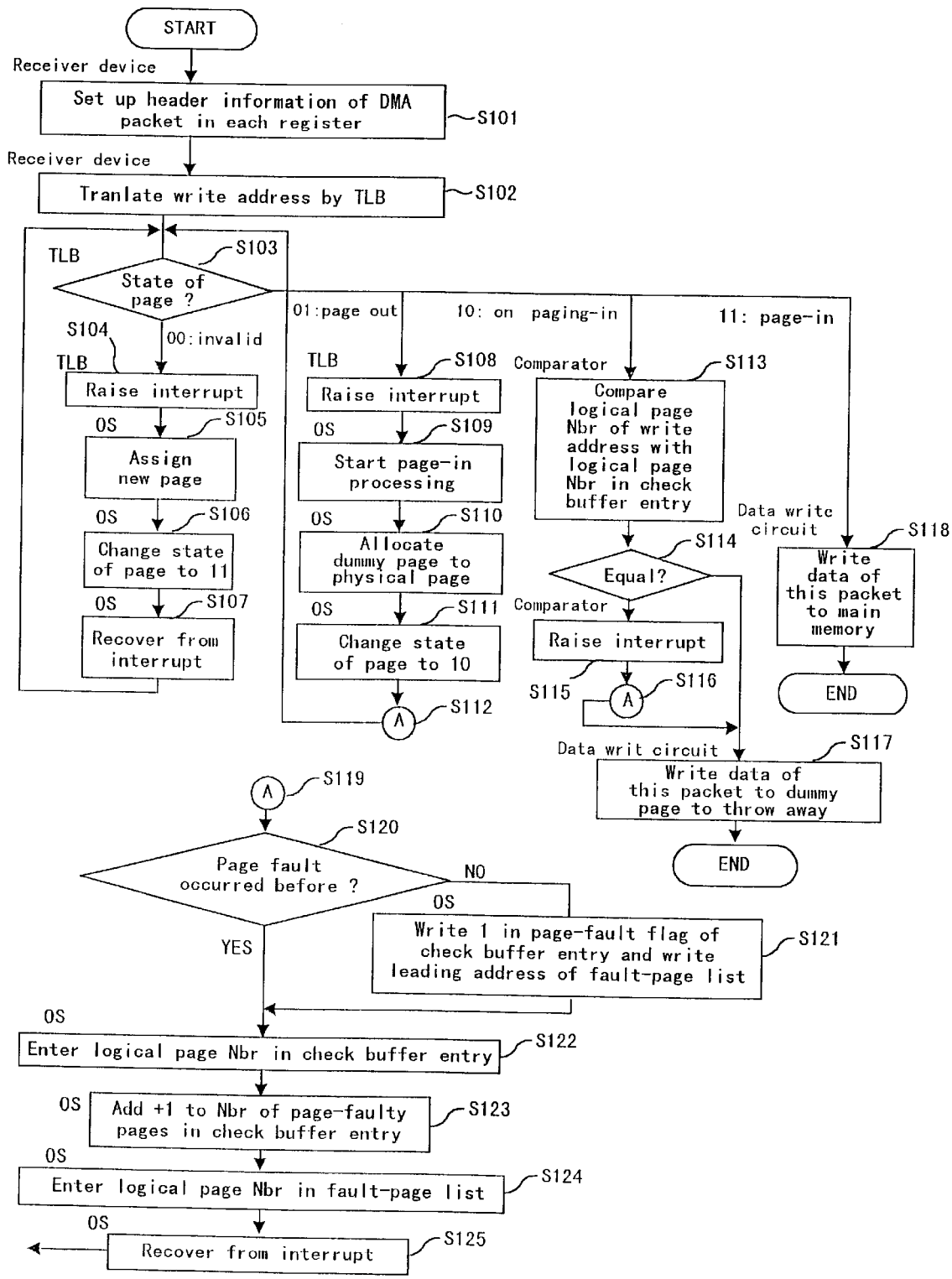
FIG. 9 is a flow chart to illustrate the procedure to deal with a page fault on the receiver side.

Now, referring to FIG. 2, FIG. 6 and FIG. 9, an explanation will be presented concerning the procedure to deal with a page fault on the receiver side.

When receiving a remote DMA packet, receiver device 6 stores the information described in the packet header in communication ID register 18, source processor number register 19 and write address register 20 (step S101). Receiver device 6 next transforms the logical address to the physical address by means of TLB 21 using both the communication ID stored in communication ID register 18 and also the write address stored in write address register 20 (step S102).

TLB 21 looks up the physical page number and the state of page from the communication ID and logical page number received, and checks state of page 230 of the physical page concerned (step S103).

If the state of page 230 indicates an invalid page "00", TLB 21 gives rise to an interrupt to have the OS allocate a new page (step S104). The OS allots a new page assigned in main memory 4 to the logical page of concern and establishes a physical page number to the new page (step S105). The OS next rewrites state of page 230 to "11" (step S106). Completion of the above-described procedure backs the OS out of the interrupt (step S107). TLB 21 inspects the newly established page information (step S103).

If state of page 230 indicates the state of page-out "01", then TLB 21 gives rise to an interrupt to have the OS deal with the following procedure (step S108): First, the OS starts page-in processing of the page concerned (step S109), next, the OS assigns the physical page number to a dummy page prepared beforehand in order to write and throw away the received data (step S110) and rewrites state of page 230 to "10" indicative of the state of "on paging-in" (step S111).

The OS next accesses check buffer entry 29 corresponding to the communication ID and source logical processor number of this packet (cf. FIG. 2) and checks page-fault flag 291 (cf. FIG. 6) (step S120). If page-fault flag 291 indicates that no page fault has occurred formerly, then the OS writes "1" in page-fault flag 291 and also enters the leading address of fault-page list 33 in check buffer entry 29 (step S121).

The OS writes this logical page number (the logical page number of the page to be accessed) into check buffer entry 29 as a page number of the latest page-faulty logical page 292 (step S122), increases the page number of the page-faulted pages (294) in check buffer entry 292 by 1 (step S123) and adds this logical page number to fault-page list 33 (124). The OS next recovers from the interrupt (S125). TLB 21 investigates the newly established page information (step S103). If state of page 230 is "10" indicative of "on paging-in", then TLB 21 notifies the content of state of page 230 to receiver device 6 without giving rise to an interrupt. Receiver device 6 accesses check buffer pointer table 31 by giving the communication ID of the packet and reads out the leading address 30 of the check buffer for the communication ID of concern. Receiver device 6 further accesses check buffer entry 29 by giving source logical processor number of the packet registered in register 19 as an offset (by giving the value of the leading address 30 plus source logical processor number, cf. FIG. 2), and compares the logical page numbers registered in the accessed check buffer entry 29 with the received logical page number (stored in write address register 20) by means of comparator 22 (step S113).

If the result of the comparison exhibits the coincidence of the two logical page numbers, then data write circuit 23 writes the received data to the corresponding physical address. This physical page as well is assigned to a dummy page beforehand. Accordingly, the received data is thrown away (step S117). If the result of the comparison exhibits two differing logical page numbers, then comparator 22 gives rise to an interrupt (step S115).

The OS, in response to the request for the interrupt made by comparator 22, accesses check buffer entry corresponding to the set of the communication ID and the source logical processor number of this packet and checks page-fault flag 291 (step S120). If the flag 291 indicates no former occurrence of a page fault, then the OS rewrites "1" to page-fault flag 291 and sets up the leading address of fault-page list 33 in check buffer entry 29 (step S121).

The OS writes the logical page number in check buffer entry 29 as the latest page-faulty page (step S122), increases the number of the page-faulty pages in check buffer entry by 1 (step S123), and adds the logical page number to fault page list 33 (step S124, cf. FIG. 6). The OS then returns from the interrupt (step S125). Then, data write circuit 23 writes the received data to the physical address. Since this physical address is assigned to a dummy page beforehand, the received data is discarded (step S117).

If state of page 230 indicates "11", indicative of the state of "page-in", then TLB 21, without giving rise to an interrupt, notifies the page information to data write circuit 23, which in turn accesses main memory 4 to write the received data (step S118). In this way, this packet is normally received.

Finally, the proceedings performed by the communication library on the transmission side will be set forth with regard to the case when a page fault happens at the time of a signal reception.

When the source processor sends the parcel of a check packet, the communication library checks a reply to the parcel of a check packet and finds page-fault flag 291 "1" indicating an occurrence of a page fault, the communication library gives rise to an interrupt to request the OS to send the data to the page-faulty page, and sleeps.

The OS on the transmitter side communicates with the OS on the receiver side and resends the data that has been written in a dummy page and thrown away, using the number of the page-faulty pages and the leading address of fault-page list 33 entered in check buffer entry 29. At the time when all the data to be sent by the remote DMA parcel from the transmitter device has been received by the transmitter device, the sleeping communication library is reactivated.

Now, a second embodiment of the present invention will be explained.

Figure 10:
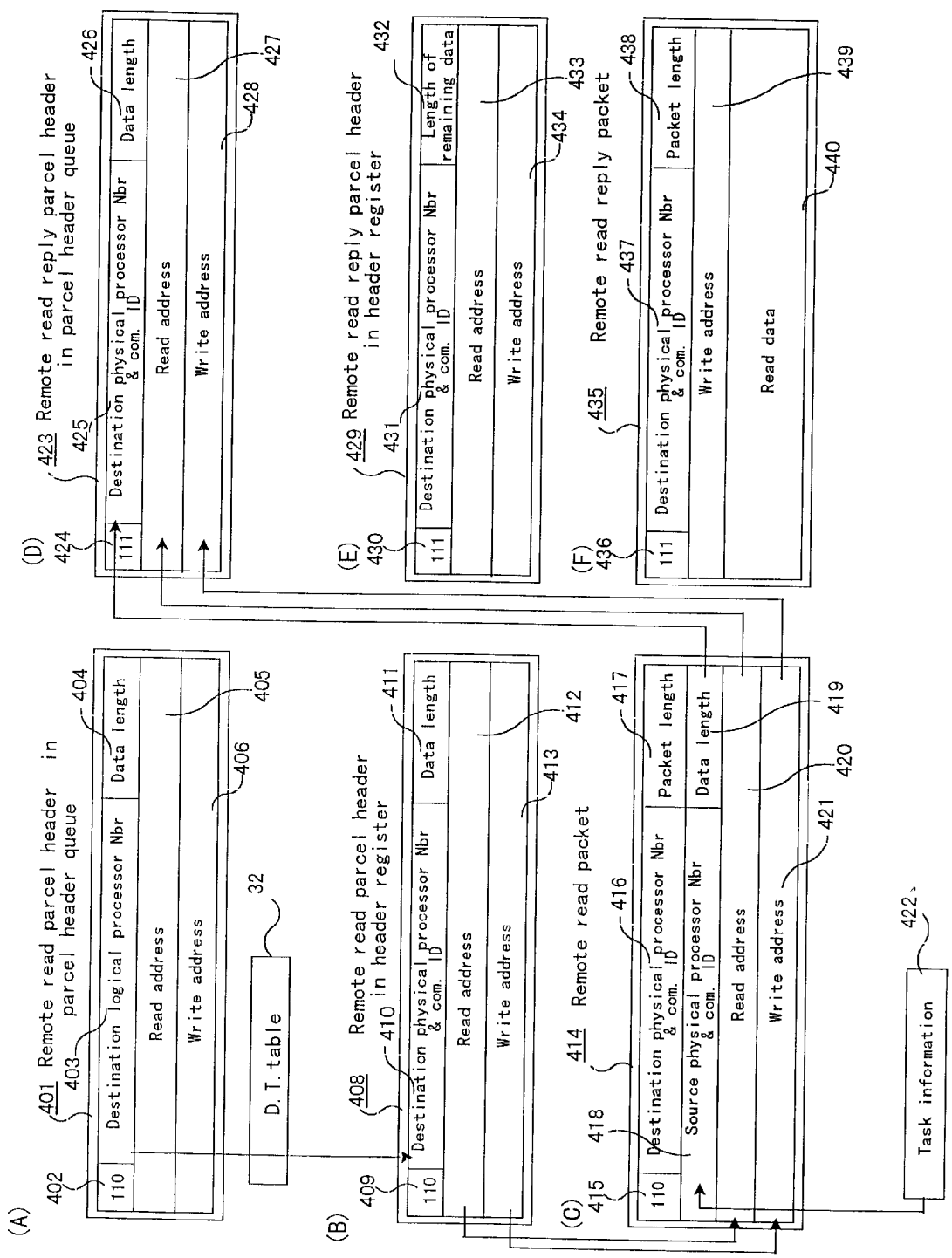
FIG. 10 represents the format diagrams of a remote read parcel and the reply parcel in reply to a check packet.

In the second embodiment, a new remote read parcel is introduced. FIG. 10 represents the block diagrams of a remote read parcel and the reply parcel to a remote read packet. (A) represents the format of remote read parcel header 401 in the parcel header queue 13; (B) represents the format of remote read parcel header 408 in header register 8; (C) represents the format of remote read packet 414; (D) represents the format of remote read reply parcel header in parcel header queue 34; (E) represents the format of remote read reply parcel header in header register 8; and (F) represents the format of remote read reply packet.

The remote read parcel header has a construction to enable the reading of the data of data length 404 stored in read address 405 of the processor designated by the destination logical processor number 403 and store the data in write address 406 in main memory 4 of the processor that sent the remote read parcel. "110" entered in code section 402 represents parcel header 401 of the remote read parcel. In parcel header 401 of remote read parcel as well, destination logical processor number 403 is translated into destination physical processor number and communication ID 410.

Packet generating circuit 9 generates remote read packet 414 based on parcel header 408 and task information 422 of the parcel header. Remote read packet 414 is made up of code section 415, destination physical processor number and communication ID 416, packet length 417, source physical processor number and communication ID 418, Data length 419, read address 420 and write address 421. "110" entered in code section 415 indicates the packet being a remote read packet. Source physical processor number and communication ID 418 are information inherently included in the task information 422. As data length 419, read address 420 and write address 421, those entered in remote read parcel header 408 are used as is. Remote read parcel header 408 is transmitted always as one remote read packet 414.

Next, remote read reply parcel header 423 will be explained. This parcel header 423 is formed by header write circuit 25 in receiver device 6 based on the information included in remote read packet 414 and stored in reply-only parcel header queue 34 on main memory 4.

Remote read reply parcel header 423 is formed of code section 424, destination physical processor number and communication ID 425, data length 426, read address 427 and write address 428. Code section entered with "111" indicates a remote read reply parcel. Source physical processor number and communication ID 418 in remote read packet 414 are entered in the fields of destination physical processor number and communication ID 425 of reply parcel header 423 as is.

Upon reading remote read reply parcel header 423 from reply-only parcel header queue 34, header read circuit 7 confirms code section 424 entered with "111" indicative of a reply to a remote read parcel. Header read circuit 7 next writes destination physical processor number and communication ID 425, written in remote read reply parcel header 423 stored in the parcel header queue, to header register 8 without transformation of destination processor number, as with the case of the reply parcel header of the check packet.

The reason for this is that destination physical processor number and communication ID 425 can be safely used as is, because remote read reply parcel header 423 is produced on the basis of source physical processor number and communication ID 418 by packet generating circuit 9 of transmitter device, and because the header 423 is stored in particular parcel header queue 34 that is inaccessible by the user task.

Packet generating circuit 9 of the destination processor determines packet length 438 on the basis of length of remaining data 432, read address 433 and write address 434 as with the case of the processing of the remote DMA parcel. After that, packet-generating circuit 9 transmits a remote read reply packet or, if need be, plural remote read reply packets 435.

As described above, the reply parcel of a remote read parcel is processed by transmitter device 5 just like the case of the remote DMA parcel. In other words, the page-out of the transmission data will possibly take place, because a transmission address is required to be translated from the logical to physical address by means of TLB 10.

The remote read reply parcel is processed in the same way as with the case of the transmission procedure of the remote DMA parcel as described above with reference to FIG. 8.

In the second embodiment, the communication library on the transmitter side reads fault-page list 33 on the receiver side through the above-described remote read parcel and retransmits the page of concern.

Figure 11:
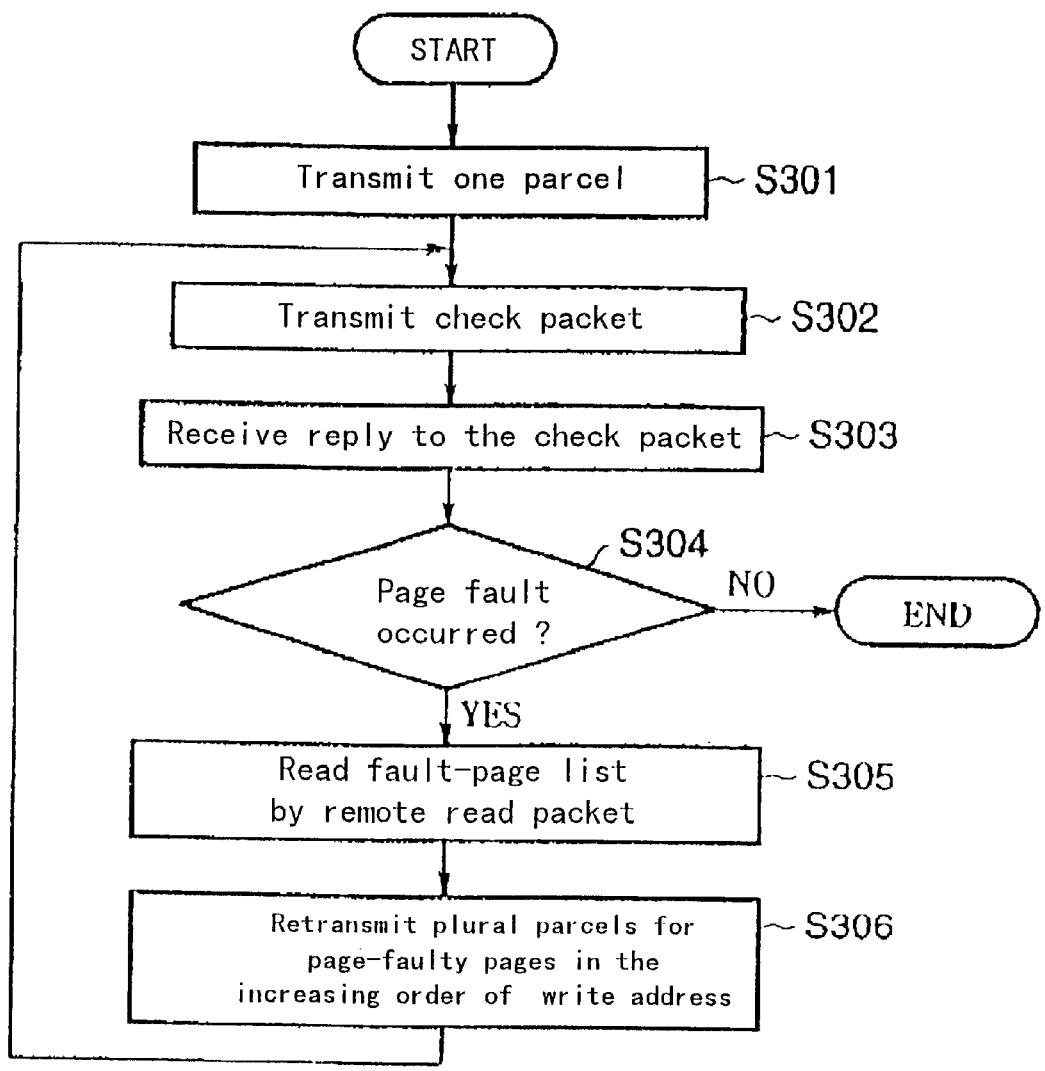
FIG. 11 is a flow chart illustrating the procedures executed by the communication library.

FIG. 11 is a flow chart illustrating the procedures executed by the communication library. The explanation will be given with reference to FIG. 6 as well as FIG. 11. The communication library sends one remote DMA (step S301) and thereafter sends a check packet (step S302). The library next receives the reply to the check packet (step S 303) and checks page-fault flag 291 of check buffer entry 29 (step S304). If the flag 291 indicates no occurrence of a page-fault, then the library transmits the next parcel.

If the flag 291 indicates an occurrence of a page fault, then the library reads the data for the page-faulty page by means of the remote read parcel using the leading address of fault-page list 33 of the entered check buffer entry 20 (step S305) and retransmits the once transmitted data for the logical page that is entered in the fault-page list 33 (step S306).

In this event, page faults may not necessarily take place in successive pages. If not, then the communication library retransmits the data in an increasing order of logical page numbers, i.e., in the order as entered in fault-page list 33, by plural parcels. The communication library further sends a check packet again at the end of the retransmission to confirm an occurrence of the page fault (step S302).

While the communication library performs the above-described retransmission of the data presuming that the page-faulty page has been already paged-in, there can be a possibility that the page-faulty page has not been paged-in yet. If there is a page that has not paged-in, then the data for the page of concern is written into a dummy page to throw away on the receiver side. The communication library retransmits the data for the page-faulty page. Since the page-faulty page will be paged-in sometime, the page fault in the retransmission will eventually cease to take place.

The second embodiment offers an advantage of enabling the load of the OS to be reduced, because the embodiment allows a user task to retransmit without any operation of the OS. Furthermore, concerning fault-page list 33, the page fault of fault-page list 33 itself can be avoided by using a predetermined area of the main memory fixed in the page-in state (the area from which no page-out is performed) for the list 33, because the size of the list is not so large to necessitate a page swap between the main memory and the virtual memory.

It is to be noted that, even in the case that fault-page list 33 is paged-out, a remote read reply parcel is processed in a similar way as the remote DMA parcel shown in FIG. 8. For this reason, a page fault of transmitted data can be properly handled. In addition, the page fault that may occur at the time of receiving a remote read reply packet would presumably be avoided. The reason for this is that: the size of fault-page list 33 is at largest 1 page; and, since the communication side that performs remote-read is the receiver side, the CPU of the receiver side can access the page to be received and thus the CPU can execute the page-in processing before receiving the page of concern.

It is to be understood, however, that although the characteristics and advantages of the present invention have been set forth in the foregoing description, the disclosure is illustrative only, and changes may be made in the arrangement of the parts within the scope of the appended claims.

What is claimed:

1. An interprocessor communication system for a parallel-computer system with plural processors combined through a network, each of said processors having a CPU, a main memory, a transmitter device and a receiver device, and communicating with other processors by means of an interprocessor communication with a read address and a write address designated in terms of a logical address, each of said processors including:

a translation means provided in each of said transmitter device and said receiver device for translating a logical address to a physical address; and a buffer means provided in a position on said main memory for storing specific information concerning a fault-page, said position being determined both by a communication ID assigned to each task and by a source logical processor number for a packet to be sent, said buffer means comprising: a flag section for storing flag information indicating an occurrence of the page fault during the interprocessor communication from a source logical processor to the task to which the communication ID is assigned; a field for entering the logical page number information of a page in which the latest page-fault takes place; a field for entering the number of logical pages in which page faults take place during the interprocessor communication concerned; and a field for entering an address information that indicates an area to store the logical page numbers of page-faulty logical pages.

2. An apparatus as claimed in claim 1, wherein said main memory is further provided with a fault-page list for storing said logical page numbers of page-faulty logical pages, and wherein if the address translation made by said translation means in said receiver device results in a physical page being in a state of page-out, then the data concerning the result of the address translation is stored in said flag section, said field for entering the logical page number information, said field for entering the number of logical pages and said field for entering an address information.

3. An apparatus as claimed in claim 2, wherein if the result of said address translation indicates the state of a page indicative of page-out, the logical page subjected to said address translation is assigned to a dummy physical page designated beforehand.

4. An interprocessor communication system as claimed in claim 2, wherein said translation means has, as information of a logical page that constitutes a part of a logical address, a number of the physical page assigned to the logical page and the state of the physical page, said state of the physical page being defined to come in any of the following specific states of page:

(i) the state of "invalid" in which the translated physical page is not allocated to the main memory;

(ii) the state of "page out" in which the translated physical page is currently absent in the main memory and is paged out to an external storing medium;

(iii) the state of "on paging-in" in which the translated physical page was previously in the state of "page out" and is currently on page-in processing;

(iv) the state of "page in" in which the translated physical page is now allocated to the main memory.

5. An interprocessor communication system as claimed in claim 4, wherein said translation means has entries of communication IDs, logical page numbers of logical pages, the physical page numbers of the physical pages assigned to the logical pages and the states of the physical pages, and is provided with a first comparison means for comparing the communication ID and logical page to be translated with the communication IDs and logical page numbers, respectively, in the entries to provide outputs of the physical page number corresponding to the logical page number of the logical page to be translated and also the state of the physical page.

6. An interprocessor communication system as claimed in claim 5, wherein said receiver device is provided with a second comparison means for comparing the logical page number to be translated with the logical page number entered in said buffer means to judge whether or not the logical page number of concern coincides with the logical page number of the latest page-faulty logical page, and wherein in the case that said translation means indicates, as the state of the physical page assigned to the logical page of concern, the state of "on page-in processing": if said second comparison means judges to be coincident, then said receiver device performs no processing; and if said second comparison means judges to be incoincident, then said receiver device raises an interrupt in order to ask the OS to add said logical page number of concern to said fault-page list to store the logical page number of concern as the latest page-faulty logical page and to increase the number of the page-faulty page in said buffer means by 1.

7. A system as claimed in claim 1, wherein the source processor transmits a check packet after one parcel is transmitted, the parcel header of said check packet having a format including a field to enter a swapping data and also a field to enter a write address for a reply packet in reply to said check packet, and wherein the destination processor, when receiving the check packet, swaps said swapping data with the entry of said buffer means to provide a reply to said check packet and returns said reply to said source processor to store said entry of the buffer means in the area of said main memory designated by said write address.

8. A system as claimed in claim 7, wherein said source processor has a means for checking whether or not a page fault takes place on the receiver side of the interprocessor communication in the latest data that has been transmitted from the source processor.

9. A system as claimed in claim 8, wherein said source processor reads said fault-page list by means of a remote read packet, said fault-page list storing the logical page numbers of the page-faulty logic pages successively entered when the page fault occurs during the interprocessor communication of concern, and retransmits exclusively the data of the logical page numbers entered in the fault-page list.

10. A system as claimed in claim 9, wherein after the retransmission, said source processor confirms presence or absence of a page fault by said packet and repeats the retransmission until said processor confirms absence of the page fault.

* * * * *